Jan. 29, 1952     R. J. McGRATH     2,584,037
DUST COLLECTOR FOR CARGO LOADING AND TRIMMING DEVICE
Filed Sept. 3, 1947     4 Sheets-Sheet 1
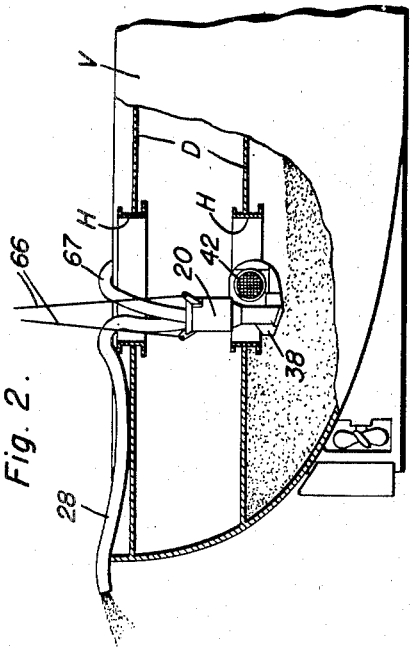
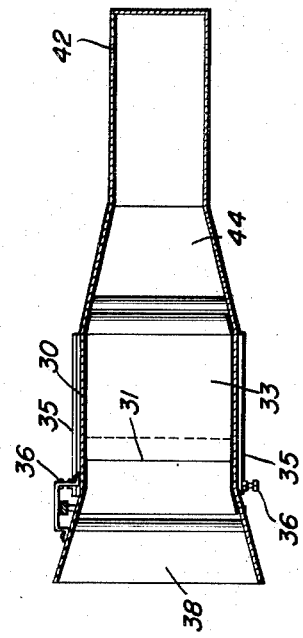
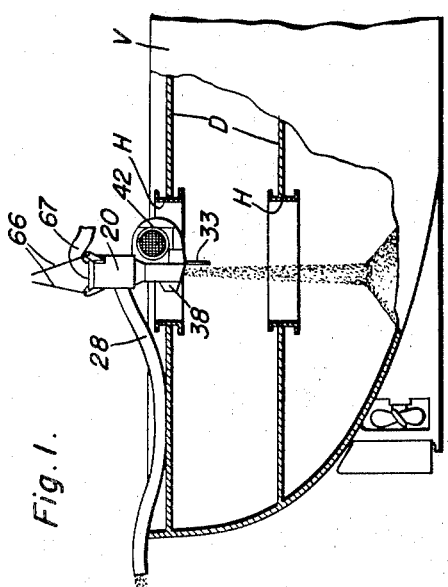
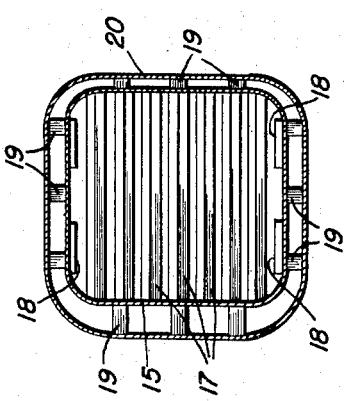
Inventor
Richard J. McGrath
By Clarence A. O'Brien
and Harvey B. Jacobson
Attorneys Jan. 29, 1952    R. J. McGRATH    2,584,037
DUST COLLECTOR FOR CARGO LOADING AND TRIMMING DEVICE
Filed Sept. 3, 1947    4 Sheets-Sheet 2
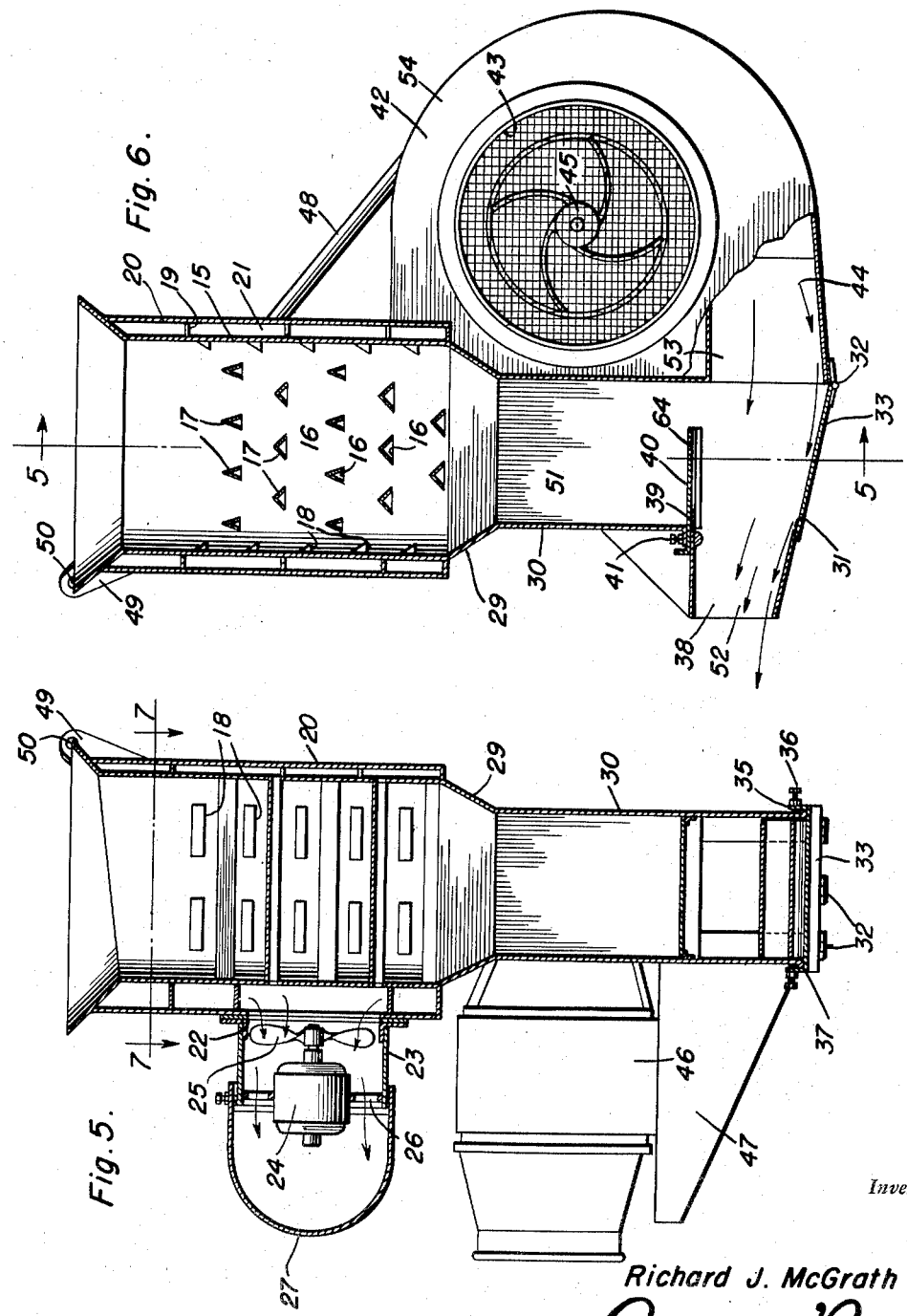
Inventor
Richard J. McGrath

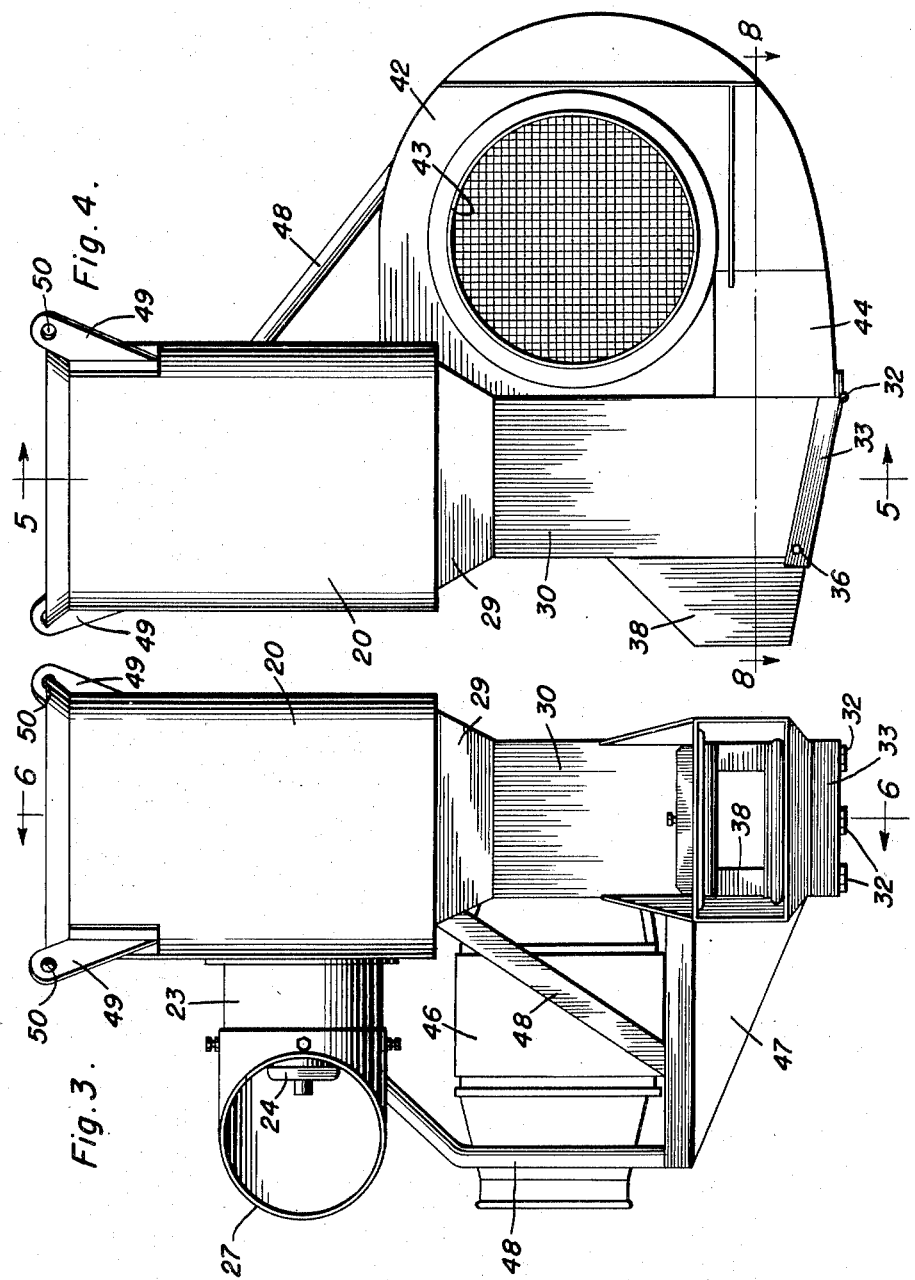

Jan. 29, 1952  R. J. McGRATH  2,584,037
DUST COLLECTOR FOR CARGO LOADING AND TRIMMING DEVICE
Filed Sept. 3, 1947  4 Sheets-Sheet 4
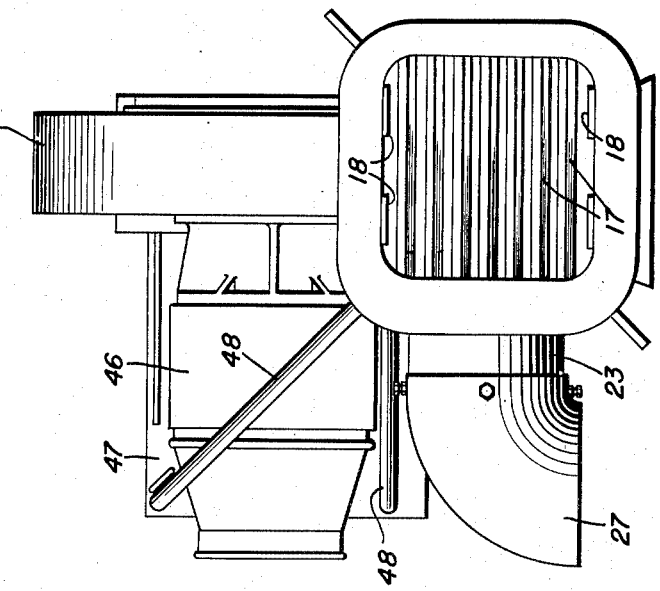
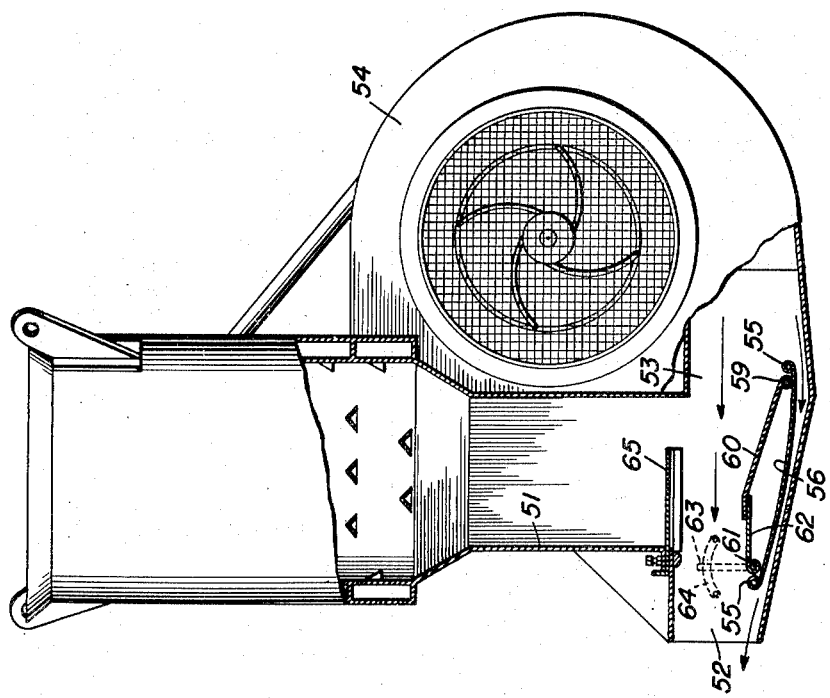
Inventor
Richard J. McGrath
By *Clarence A. O'Brien and Harvey B. Jacobson*
Attorneys Patented Jan. 29, 1952

2,584,037

UNITED STATES PATENT OFFICE 2,584,037

DUST COLLECTOR FOR CARGO LOADING AND TRIMMING DEVICE

Richard J. McGrath, Virginia Beach, Va., assignor to Atlantic and Gulf Stevedores, Inc., Norfolk, Va., a corporation of Virginia Application September 3, 1947, Serial No. 771,925

1 Claim. (Cl. 209—134)

This invention relates to loading vessels and trimming the cargo thereof and has for its primary object to facilitate a proper distribution of granular material in the hold of a vessel in such a manner as to avoid the shifting of the cargo while in transit and also to eliminate the danger of dust explosions which frequently result through the improper trimming of a dust-bearing cargo.

Another object is to remove dust and chaff from the material being loaded before it is deposited in the hold of the vessel, thus not only minimizing the possibility of dust explosion but also contributing to the health and comfort of those engaged in the work of trimming vessels.

The above and other objects may be attained by employing this invention which embodies among its features a hopper having an open end adapted to receive the material to be loaded in the hold of a vessel, said hopper having a discharge opening remote from and aligning with its open end, a lateral discharge nozzle opening into the hopper adjacent the discharge opening, means on the hopper to close the discharge opening and means on the hopper to direct an air blast transversely thereof in alignment with discharge nozzles to redirect the direction of flow of the material being loaded.

Other features include means between the junction of the discharge nozzle and the hopper and the open end of the hopper to alter the size of the passage through the hopper, means to create a cross draft intermediate the ends of the hopper to extract dust and chaff from the material passing through the hopper, and means extending transversely of the hopper in the path of movement of the material falling through the hopper and within the zone of the cross draft to change the course of movement of the material.

In the drawings:

Figure 1 is a fragmentary view partially in section of the side of a vessel showing this improved cargo loading and trimming device in operation as a loading device, Figure 2 is a view similar to Figure 1 illustrating the device in use in trimming the cargo, Figure 3 is an enlarged front view of the cargo loader and trimmer, Figure 4 is a side view of Figure 3, Figure 5 is a vertical sectional view taken substantially along the line 5—5 of Figure 4, Figure 6 is a horizontal sectional view taken substantially along the line 6—6 of Figure 4, Figure 7 is a horizontal sectional view taken substantially along the line 7—7 of Figure 5, Figure 8 is a horizontal sectional view taken substantially along the line 8—8 of Figure 4, Figure 9 is a top plan view of the vessel trimmer and loader illustrated in the drawings previously described, and Figure 10 is a fragmentary sectional view similar to Figure 6 of a modified form of the invention illustrating an adjustable venturi.

Referring to the drawings in detail, this improved loading and trimming device comprises a hopper 15 having formed in opposite side walls a group of triangular openings 16, and fitted in these openings and extending transversely across the hopper are angle bars 17. The apices of the openings 16 are disposed upwardly so that the angle bars 17 will form deflectors for material falling through the hopper on its way to the hold of the vessel being loaded. The hopper 15 is substantially square in cross section and formed in opposed walls intermediate those provided with the openings 16 are louvred openings 18, the louvres of which open downwardly and in such a manner as to direct material coming in contact therewith toward the center of the hopper 15. Supported on suitable spacers 19 carried on the outer sides of the walls of the hopper 15 is a jacket 20 forming in conjunction with the hopper an air chamber 21 which completely surrounds the hopper and is provided in one side with an opening 22. Surrounding the opening 22 and projecting laterally from the jacket 20 is a tubular thimble 23 adjacent the outer end of which is supported the drive motor 24 for an exhaust fan 25. The motor 24 is supported on a suitable spider or perforated support 26 through which air is propelled by the fan 25 when the motor 24 is set into operation. Coupled to the outer end of the thimble 23 is a suitable elbow 27 to which a flexible conduit 28 (Figs. 1 and 2) is attached.

The lower end of the hopper tapers inwardly as at 29 and the convergent ends of the walls of the tapered portion 29 terminate in depending walls forming throat 30 through which the material to be loaded passes after leaving the hopper. The lower end of the throat is provided with a discharge opening 31, and hinged as at 32 adjacent the lower end of the throat and in a position to close the opening 31 is a door 33. The end of the door remote from the hinge 32 is equipped on opposite side edges with upstanding flanges 35 which are pierced to receive bolts 36 which as illustrated in Figure 5 are adapted to be projected inwardly toward the side walls of the throat 30 to engage outturned flanges 37 thereon and hold the door 33 in closed position.

Projecting laterally from the throat 30 adjacent the opening 31 is a discharge nozzle 38, and formed at the junction of the throat 30 and the discharge nozzle 38 is a transverse slot 39 in which a door 40 is mounted to slide. As illustrated in the drawings, this door 40 is adapted to be adjusted by means of a suitable set screw 41 carried by the throat 30 adjacent its junction with the discharge nozzle 38 in order to regulate the size of the passage through the throat through which the material to be loaded is directed on its way to the discharge opening 31. Attached to the side of the hopper 15 adjacent its lower end and extending throughout the length of the throat 30 is a blower casing 42 provided with a screened intake opening 43 and having a tangential discharge passage 44 which aligns substantially axially with the nozzle 38. A suitable impeller 45 is mounted within the casing 42 and is driven by a conventional electric drive motor 46 which is mounted on a suitable bracket 47 carried by the throat 30. The blower casing 42 and the motor 46 are supported on the platform 47 which in turn is braced by braces 48 extending from the platform to the hopper, and fixed to the upper end of the jacket 20 and extending upwardly and outwardly therefrom are suspension brackets 49 which are pierced as at 50 to receive suspension cables by means of which the device is held in proper position to be lowered through the hatches of the vessel to be loaded and trimmed.

In the modified form of the invention illustrated in Figure 10 the lower end of the hopper previously described terminates in a throat 51 which instead of being provided with a discharge opening which aligns with the discharge end of the hopper, has a closed bottom wall but carries a lateral discharge nozzle 52 which aligns with the tangential discharge opening 53 of a blower 54 which corresponds in all respects to the blower previously described. Fixed in opposite side walls of the discharge nozzle 52 and the nozzle 53 of the blower, near their lower sides are transversely extending bars 55 which support in spaced relation to the bottom wall of the throat 51 a curved wall 56 forming an air passage through which the high velocity air issuing from the blower 54 is discharged into the nozzle 38 for a purpose to be more fully hereinafter explained. Mounted on a cross bar 59 which extends transversely between opposite side walls of the discharge end 53 of the blower 54 near the cross bar 55 therein is a plate 60 which is adapted to move in a vertical arc about the axis of the cross bar 59. A shaft 61 is mounted to rotate about a horizontal axis in the nozzle 38 slightly to the rear of the cross bar 55 and fixed to the shaft 61 is a plate 62, the free edge of which lies under the edge of the plate 60 remote from the shaft 59, so that when the plate 62 is rotated about the axis of the shaft 61, the plate 60 will be raised or lowered according to the direction of rotation of the plate 62. The shaft 61 projects through one of the side walls of the nozzle 52 and fixed thereto is one end of a hand lever 63 the opposite end of which rocks within the confines of an arcuate guard 64 fixed to the outer side of the nozzle 52. It will thus be seen that by moving the lever 63, the shaft 61 may be rotated to raise or lower the free end of the plate 62 and likewise cause the edge of the plate 60 remote from the shaft 59 to move upwardly or downwardly according to the direction of movement of the plate 62. Like the throat 30, the throat 51 is provided adjacent its junction with the nozzle 52 with an adjustable door 65 by means of which the volume of material passing through the throat 51 and entering the nozzle 52 may be regulated.

In use, when it is desired to load a vessel V, this improved loading and trimming device is suspended on cables 66 connected with the ship's boom and suspended over the hatches H which open through the decks D of the vessel V. The door 33 is swung open as illustrated in Figure 1, and the material to be loaded is introduced into the hopper 15 through a suitable conduit 67. The motor 24 is coupled with a suitable source of power supply and the material falling through the hopper 15 will encounter the deflectors 17 so as to take a tortuous course through the hopper during its descent toward the throat 30. While passing through the hopper, a negative pressure will be formed in the chamber 21 between the wall of the hopper and the jacket 20 so that dust and chaff will be extracted from the falling material through the openings 16 and the louvred openings 18, to be discharged through the elbow 27 and flexible conduit 28 to any suitable receptacle or over the side of the vessel. The material will then pass downwardly through the throat 30 to be discharged through the opening 31 into the hold of the vessel V until the material substantially fills the hold in the form of a pile as suggested in Figure 1. When the top of the pile reaches the underside of the lower deck D, the loader and trimmer is lowered as suggested in Figure 2 and the door 33 closed, whereupon the impeller 45 of the blower 42 is driven by setting the motor 46 into operation, thus causing a blast of air to be discharged through the discharge opening 44 thereof and substantially perpendicular to the direction of fall of the material, so as to direct the material outwardly through the nozzle 38. In this way the material to be loaded may be directed laterally into the various cracks and crannies of the vessel V so as to completely fill all of the crevices and prevent a shifting of the cargo while in transit.

In employing the modified form of the invention illustrated in Figure 10, the discharge opening 31 in the bottom of the neck 30 may be dispensed with and the bottom may be solid or if so desired, the discharge opening may be retained and the door 33 held closed. With the bar 55 and false bottom 56 in place and the throat control plates 60 and 62 mounted on their respective shafts 59 and 61, an adjustable venturi at the discharge end of the lower nozzle 53 will be formed so that upon moving the lever 63 about the axis of the shaft 61, the shaft 61 will be rotated, thus raising or lowering the plate 62 and moving the plate 60 in accordance therewith. In this way, the distance between the upper surface of the plate 60 and the under surface of the sliding door 65 may be governed so as to increase or decrease the velocity of the air being discharged through the nozzle 52. By reason of the false bottom 56, it will be obvious that the high velocity air current created by the extreme outer ends of the blades of the impeller within the fan 54 will be directed in a reduced stream to be ejected through the nozzle 52 and form a cushion under the material which is flowing through the neck 51 to sustain it during its flight toward its destination. In this way the material being loaded may be caused to travel long distances beyond the end of the nozzle 52, thus facilitating the trimming of the cargo by projecting it into the cracks and crevices within the hold of the vessel. In employing the device of Figure 10, rapidity of loading is sacrificed for efficiency in trimming the cargo.

While in the foregoing there has been shown and described the preferred embodiment of this invention, it is to be understood that minor changes in the details of construction, combination and arrangement of parts may be resorted to without departing from the spirit and scope of the invention as claimed.

Having described the invention, what is claimed as new is:

An apparatus for loading and trimming cargo of vessels comprising a substantially rectangular hopper having an open end adapted to receive the material forming the cargo to be loaded in the hold of a vessel, said hopper having a discharge opening remote from and in alignment with the open end, said hopper having a plurality of staggered rows of triangular-shaped openings in a pair of opposed side walls thereof, said hopper having a plurality of rows of exhaust openings in the other pair of opposed side walls, a plurality of inverted V-shaped deflectors terminally positioned in said triangular-shaped openings and supported by said first pair of opposed side walls and extending therebetween, a jacket surrounding the hopper, a plurality of spacers terminally secured to said jacket and said side walls holding said jacket in spaced relation to said hopper to form a chamber into which said exhaust openings open, and an exhaust fan communicating with the chamber to create a draft of air through the exhaust openings.

RICHARD J. McGRATH.

REFERENCES CITED

The following references are of record in the file of this patent:

UNITED STATES PATENTS

| Number | Name | Date |
|---|---|---|
| 321,552 | Wakeford | July 7, 1885 |
| 955,714 | Steedman | Apr. 19, 1910 |
| 1,124,830 | Allen | Jan. 12, 1915 |
| 1,179,786 | Walsh | Apr. 18, 1916 |
| 1,229,994 | McWhorter | June 12, 1917 |
| 1,240,409 | Black | Sept. 18, 1917 |
| 1,296,903 | Baker | Mar. 11, 1919 |
| 1,511,025 | Christoph | Oct. 7, 1924 |
| 1,655,577 | Stebbins | Jan. 10, 1928 |
| 1,676,757 | West | July 10, 1928 |
| 1,745,195 | Thurmond | Jan. 28, 1930 |
| 2,441,724 | Simpson | May 18, 1948 |
| 2,446,968 | Toner | Aug. 10, 1948 |

FOREIGN PATENTS

| Number | Country | Date |
|---|---|---|
| 672,014 | France | Dec. 21, 1929 |
| 324,956 | Great Britain | Feb. 7, 1930 |